US011421527B2

(12) United States Patent
Dickenson et al.

(10) Patent No.: US 11,421,527 B2
(45) Date of Patent: Aug. 23, 2022

(54) SIMULTANEOUS DISTRIBUTED MEASUREMENTS ON OPTICAL FIBER

(71) Applicant: SCHLUMBERGER TECHNOLOGY CORPORATION, Sugar Land, TX (US)

(72) Inventors: Paul Frederick Cilgrim Dickenson, Romsey (GB); Gareth Lees, Romsey (GB); Peter Wait, Romsey (GB); Jakub Szypicyn, Southampton (GB); Colin Allan Wilson, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 522 days.

(21) Appl. No.: 16/320,817

(22) PCT Filed: Jul. 25, 2017

(86) PCT No.: PCT/US2017/043577
§ 371 (c)(1),
(2) Date: Jan. 25, 2019

(87) PCT Pub. No.: WO2018/022532
PCT Pub. Date: Feb. 1, 2018

(65) Prior Publication Data
US 2019/0169985 A1    Jun. 6, 2019

Related U.S. Application Data

(60) Provisional application No. 62/367,523, filed on Jul. 27, 2016.

(51) Int. Cl.
*E21B 47/135* (2012.01)
*E21B 47/06* (2012.01)
*G01H 9/00* (2006.01)
*G01D 5/353* (2006.01)
(Continued)

(52) U.S. Cl.
CPC ............ *E21B 47/135* (2020.05); *E21B 47/00* (2013.01); *E21B 47/06* (2013.01); *E21B 47/12* (2013.01);
(Continued)

(58) Field of Classification Search
CPC ........ E21B 47/135; E21B 47/00; E21B 47/12; E21B 47/06; G01K 11/32; G01V 1/226;
(Continued)

(56) References Cited

U.S. PATENT DOCUMENTS 6,380,534 B1 * 4/2002 Farhadiroushan ........................... G01D 5/35364
250/227.14
2003/0103549 A1 * 6/2003 Chi .................. G01K 11/32
374/45
(Continued)

FOREIGN PATENT DOCUMENTS

WO    2010099484 A2    9/2010
WO    2014209511 A1    12/2014

OTHER PUBLICATIONS

Hausner, M. B. et al., "Identifying and Correcting Step Losses in Single-Ended Fiber-Optic Distributed Temperature Sensing Data" Journal of Sensors, 2016, vol. 2016, Article ID 7073619, 11 pages.
(Continued)

Primary Examiner — Dominic J Bologna

(57) ABSTRACT

A system and technique for obtaining two or more distributed measurements from an optical sensing fiber deployed along a desired measuring path are disclosed. Interrogating probes from two or more different distributed measuring systems are combined and launched into the sensing fiber. Backscattered light generated in response to the combined interrogating probes is separated into portions and each portion is provided to a respective distributed measuring instrument. In this manner, distributed measurements corre-
(Continued)

sponding to different parameters of interest, such as temperature and pressure, along the measuring path can be measured simultaneously using the same sensing fiber.

20 Claims, 3 Drawing Sheets

(51) Int. Cl.
E21B 47/12 (2012.01)
G01K 11/32 (2021.01)
G01V 1/22 (2006.01)
E21B 47/00 (2012.01)

(52) U.S. Cl.
CPC ..... *G01D 5/35361* (2013.01); *G01D 5/35387* (2013.01); *G01H 9/004* (2013.01); *G01K 11/32* (2013.01); *G01V 1/226* (2013.01); *G01D 5/35316* (2013.01); *G01V 2210/1234* (2013.01); *G01V 2210/1429* (2013.01)

(58) Field of Classification Search
CPC ... G01V 2210/1234; G01V 2210/1429; G01H 9/004; G01D 5/35361; G01D 5/35387; G01D 5/35316
See application file for complete search history.

(56) References Cited

U.S. PATENT DOCUMENTS

| | | | | |
|---|---|---|---|---|
| 2003/0174924 | A1* | 9/2003 | Tennyson | G01L 1/242 385/12 |
| 2003/0234921 | A1* | 12/2003 | Yamate | G01K 15/00 356/73.1 |
| 2004/0222901 | A1 | 11/2004 | Dodge et al. | |
| 2007/0242262 | A1 | 10/2007 | MacDougall | |
| 2011/0228255 | A1* | 9/2011 | Li | G01K 11/32 356/33 |
| 2011/0320147 | A1* | 12/2011 | Brady | G01V 1/40 702/66 |
| 2013/0070235 | A1* | 3/2013 | Chen | G01D 5/35303 356/73 |
| 2013/0222811 | A1* | 8/2013 | Handerek | G01L 11/025 356/477 |
| 2013/0271769 | A1* | 10/2013 | Handerek | G01D 5/35383 356/446 |
| 2014/0339411 | A1* | 11/2014 | Lagace | E21B 47/135 250/269.1 |
| 2014/0376001 | A1* | 12/2014 | Swanson | G01N 21/4795 356/479 |
| 2015/0003497 | A1* | 1/2015 | Burov | G01K 11/32 374/161 |
| 2015/0211900 | A1* | 7/2015 | Xue | B01J 19/00 356/73.1 |
| 2016/0097275 | A1 | 4/2016 | Santoso | |

OTHER PUBLICATIONS

Search Report and Written Opinion of International Patent Application No. PCT/US2017/043577 dated Jul. 25, 2017, 16 pages.
Extended Search Report issued in the EP Application 17835077.3, dated Mar. 11, 2020 (8 pages).

* cited by examiner

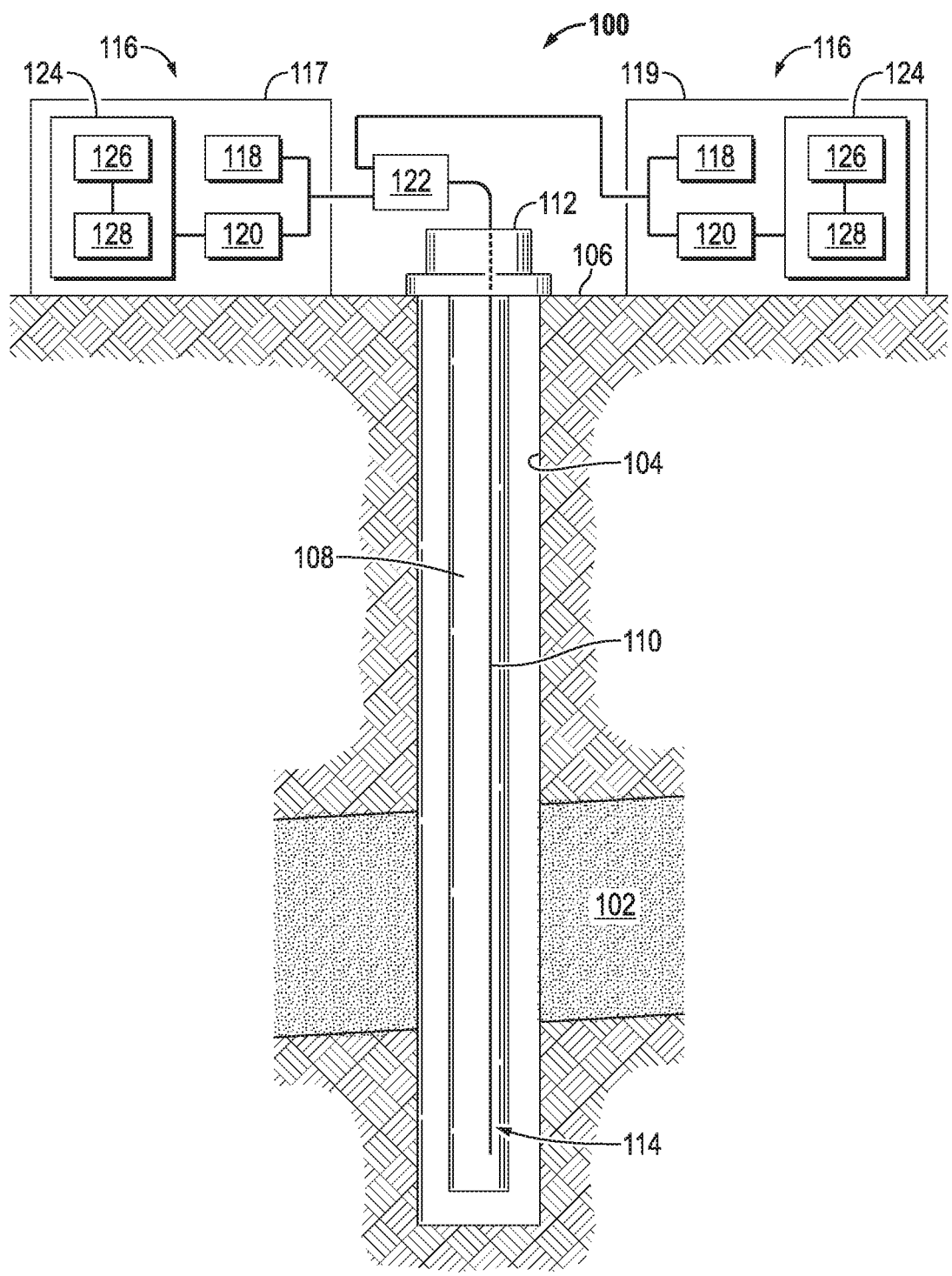

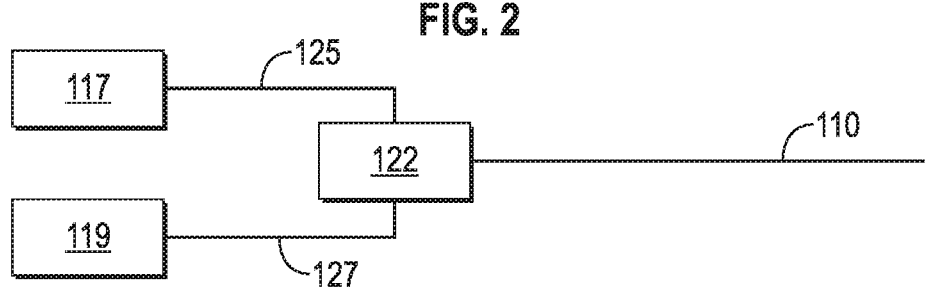
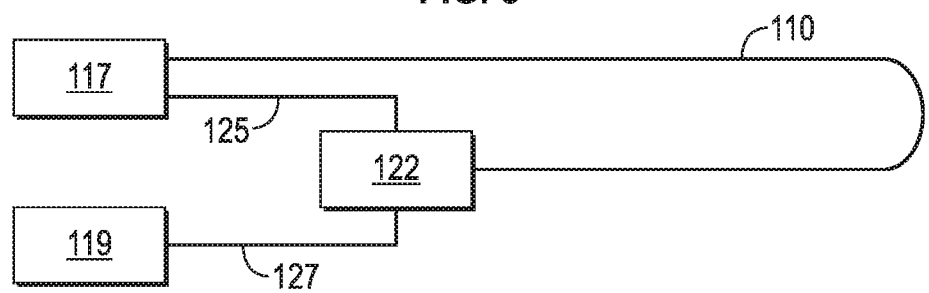
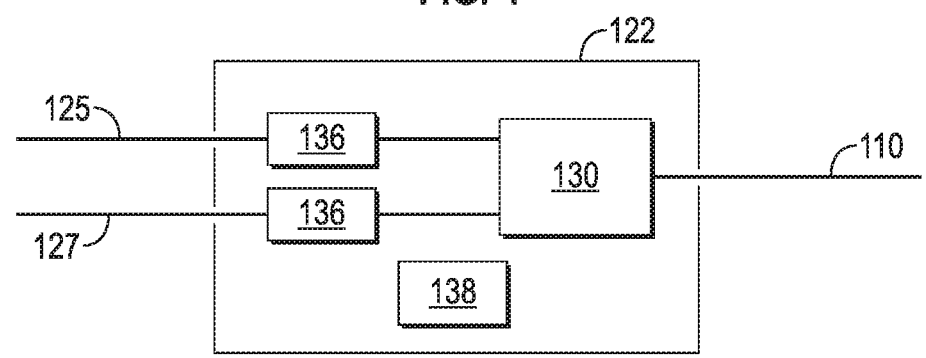
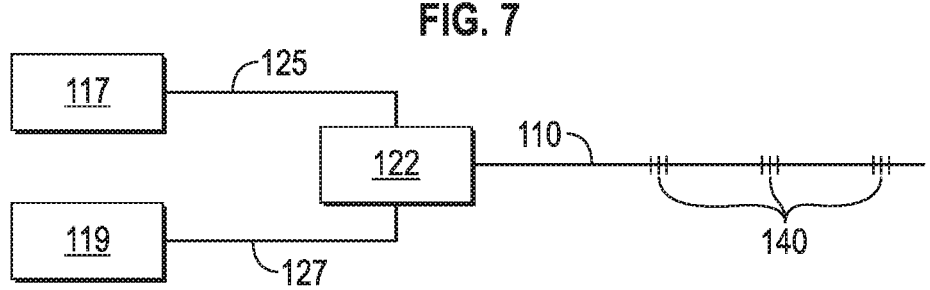

SIMULTANEOUS DISTRIBUTED MEASUREMENTS ON OPTICAL FIBER

RELATED APPLICATIONS

This application claims priority to U.S. provisional application Ser. No. 62/367,523, filed Jul. 27, 2016, which is incorporated by reference herein in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. Information from the wells can prove valuable, but reliably obtaining useful information from the well is difficult.

One manner in which information can be obtained from a well is to use a distributed fiber optic sensing system, such as a distributed temperature sensing system or a distributed vibration or acoustic sensing system. Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. Yet further, certain classes of sensors can be distributed along the length of an optical fiber so that an appropriate interrogation system can be employed to monitor selected environmental parameters at multiple locations at the same time. For instance, when deployed in a hydrocarbon well, a fiber optic sensor can provide indications of characteristics of production fluids, such as fluid composition, density, viscosity, flow rate, etc. Various drilling, production and remedial operations can then be performed based on the information derived from the monitored parameters.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

FIG. 1 is a cross-sectional schematic view of a sensing system for obtaining simultaneous distributed measurements of different parameters from an optical sensing fiber deployed in a wellbore, according to an embodiment.

FIG. 2. is a schematic illustration of a sensing system, according to an embodiment.

FIG. 3 is a schematic illustration of a sensing system, according to another embodiment.

FIG. 4 is a schematic illustration of an adapter for use in sensing system, according to an embodiment.

FIG. 7 is a schematic illustration of a sensing system that includes discrete sensors, according to an embodiment.

SUMMARY

Figure 5:
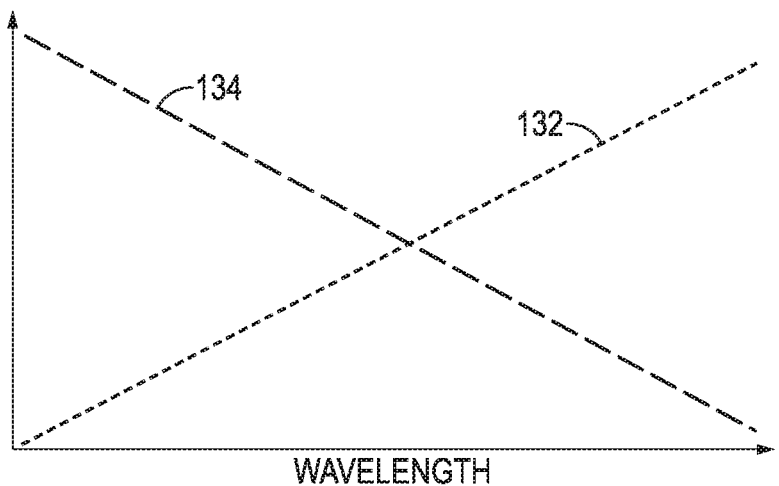
FIG. 5 is a graph of an idealized wavelength filter response of an adapter, according to an embodiment.

Certain embodiments of the present disclosure are directed to a distributed measurement system that includes a sensing fiber deployed along a desired measurement path. The system also includes first and second measuring instruments to generate probe signals to launch into the sensing fiber and to acquire measurement data from backscattered light generated in response to the probe signals. An adapter is coupled to the first and second measuring instruments and to an end of the sensing fiber. The adapter combines the probe signals for simultaneous launch into the fiber, separates the backscattered light generated in response to the combined probe signals and provides a first separated portion to the first measuring instrument and a second separated portion to the second measuring instrument.

Embodiments disclosed herein also are directed to a method for making simultaneous distributed measurements along an optical sensing fiber deployed along a desired measurement path. A distributed measurement of a first parameter of interest is acquired simultaneously with acquiring a distributed measurements of a second parameter of interest that is different than the first parameter.

Embodiments disclosed herein further are directed to a distributed measurement system for used in a wellbore. The system includes a sensing fiber deployed in the wellbore and an adapter to combine two or more probe signals to launch simultaneously into the fiber and to separate the backscattered light generated in response into a first backscatter portion and a second backscatter portion. A data acquisition system acquires measurement data from the first and second backscatter portions, where first data corresponds to a first parameter of interest and second data corresponds to a second parameter of interest that is different than the first parameter.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Embodiments of the present disclosure are directed to systems and techniques for using optical fibers to detect various environmental parameters of interest along the fiber. The optical fiber(s) can be deployed in an oilfield well or in any other suitable environment, such as for electrical cable monitoring, pipeline leak monitoring, fire detection, intrusion detection, etc. In oilfield well applications, as an example, characteristics of fluid flow in a well are of particular interest, including fluid density, viscosity, flow rate and composition (e.g., fractional composition of gas/water/oil). In general, one way to detect fluid flow is to monitor the ambient vibration or acoustic noise associated with the flow in a region of interest. This vibration or acoustic noise can be logged as a function of location and, thus, provide valuable information that can be used to control and/or enhance production, to perform remedial measures, and/or to assess well integrity (e.g., casing leaks, etc.). A fiber optic monitoring system, such as a system that employs an optical fiber that is configured to provide a distributed response to acoustic events, can be used to monitor the ambient flow noise in the region of interest. Temperature measurements also provide valuable information, and a fiber optic monitoring system that employs an optical fiber can be used to monitor the environmental conditions in the region of interest.

In general, fiber optic monitoring systems, particularly distributed fiber-optic monitoring systems, employ an optical source (e.g., a laser) to generate pulses of optical energy to launch into an optical fiber that is deployed in a region of interest (e.g., in a wellbore). As the launched pulses travel along the length of the optical fiber, small imperfections in the fiber reflect a portion of the pulses, generating backscatter. When the fiber is subjected to events in the region of interest (such as vibration or acoustic signals propagating through the region of interest, strain on the fiber, temperature changes, etc.), the distances between the imperfections change. Consequently, the backscattered light also changes. By monitoring the changes in the backscatter light generated by the fiber (e.g., spontaneous Raman scattering, stimulated Brillouin scattering, or Rayleigh scattering) in response to interrogating probe signals launched into the fiber from an interrogation system, it is possible to determine characteristics of the event(s) (e.g., temperature, strain, vibration) experienced by the fiber. The measured event(s) can then be used to derive information about the region of interest.

One type of fiber optic monitoring system is referred to as a Distributed Vibration Sensing (DVS or hDVS) system or, alternatively, a Distributed Acoustic Sensing (DAS) system. For convenience, DVS, hDVS and DAS systems are generally referred to herein as a DVS system. DVS systems have been used to efficiently gather data in applications such a pipeline security monitoring and vertical seismic profiling. DVS systems also have been deployed to monitor fluid flow in subterranean wellbores. Another type of fiber optic monitoring system is referred to as a Distributed Temperature Sensing (DTS) system. DTS systems have been used to derive a temperature profile in a wellbore and in other applications where temperature changes can provide information about a region of interest, such as to detect fluid flow, pipeline leaks, overheating conditions, stress, etc. Multiple types of distributed sensing systems and techniques are known and any of these types of known systems and techniques, as well as systems and techniques yet to be developed, can be used to obtain the distributed measurements described herein.

While DVS and DTS systems have been used in many types of applications, a single fiber generally is used for each different type of measurement. Consequently, multiple fibers must be installed in order to obtain simultaneous measurements of different types of parameters, increasing the cost of new installations and reducing compatibility with existing fiber deployment systems, such as a slickline or wireline unit or cable that may not contain the required number of fibers. Accordingly, embodiments of the present disclosure are directed to a device that allows different distributed measurements to be made simultaneously using a single fiber.

Turning now to FIG. 1, a cross-sectional, schematic representation of a well 100 that penetrates a subterranean formation 102 is shown. The well 100 is formed by drilling a borehole 104 through the surface 106 so that it penetrates the subterranean formation 102. A casing 108 can then be lowered and set in place. In FIG. 1, a cable containing a distributed fiber optic sensor 110 is deployed in the well 100 to measure parameters of interest. The sensor 110 extends through a wellhead 112 and terminates at a far end 114 at a depth in the borehole 104. Although a cased well structure is shown, it should be understood that embodiments of the invention are not limited to this illustrative example. Uncased, open hole, gravel packed, deviated, horizontal, multi-lateral, deep sea or terrestrial surface injection and/or production wells (among others) may incorporate the systems and techniques as described. Further, the fiber optic sensor 110 can be permanently installed in the well 100 or can be removably deployed in the well, such as for use during remedial operations.

The fiber optic sensor 110 generally is contained within a protective casing or a conduit (e.g., a control line). As shown in FIG. 1, the fiber optic sensor 110 is coupled to a surface interrogation and acquisition system 116, which is arranged to acquire data from the optical fiber 110 using any suitable technique. To that end, the system 116 includes a first distributed measuring instrument 117 (e.g., a DTS instrument) and a second distributed measuring instrument 119 (e.g., a DVS instrument), both of which are configured to interrogate and acquire data from the optical fiber 110. Each of instruments 117 and 119 includes an optical source 118 (e.g., a coherent narrowband laser) to generate an optical probe signal (e.g., one or more pulses) to launch into the fiber 110, such as through a circulator. The instruments 117 and 119 also each includes an optical receiver/detector 120 (e.g., a photodetector) to detect backscattered light generated by the fiber 110 in response to the interrogating optical signal.

The arrangement shown in FIG. 1 also includes an adapter 122 that couples the instruments 117 and 119 to the sensing fiber 110 and allows for simultaneous measurements of different parameters of interest. Schematic illustrations of example deployments of the adapter 122 with instruments 117, 119 and sensing fiber 110 are shown in FIGS. 2 and 3.

With reference to FIG. 2, a first example embodiment of a fiber optic sensing system 200 that includes the adapter 122 is schematically shown. In this embodiment, the sensing fiber 110 is connected to both instruments 117 and 119 through the adapter 122 and respective output fiber sections 125 and 127. In an embodiment, the sensing fiber 110 and the fiber section 125 can be multi-mode fibers, and the fiber section 127 can be a single-mode fiber. However, in other embodiments, any of the fiber 110 and the fiber sections 125 and 127 can be single-mode or multi-mode or any other type of optical fiber suitable for the application in which the sensing system 200 is deployed. In this embodiment, the sensing fiber 110 is configured for a single-ended measurement by the instruments 117, 119.

A second example embodiment of a fiber optic sensing system 300 that includes the adapter 122 is schematically illustrated in FIG. 3. Here, the sensing fiber 110 can be a multi-mode fiber that is connected to the instruments 117 and 119 through the adapter 122 and respective fiber sections 125 and 127. Also, as shown in FIG. 3, the sensing fiber 110 is arranged for double-ended measurements by instrument 117. That is, a first end of the fiber 110 is connected to the instrument 117 through the adapter 122 and fiber section 125, while the second end of the fiber 110 is connected directly to the instrument 117. In this way, the instrument 117 can launch probe signals into either end of the fiber 110 and detect backscattered light generated in response to the probes at either end of the fiber 110. And, again, it should be understood that any of the fibers 110, 125 and 127 can be any type of fiber, such as a single-mode or a multi-mode fiber.

It also should be understood that embodiments of the sensing systems described herein are not limited to sensing systems that include both a DTS system and a DVS system or to only two distributed sensing systems. Rather, the arrangements and techniques described herein also can be applied to sensing systems in which the adapter 122 enables two or more simultaneous distributed measurements from one sensing fibers. For example, the adapter 122 can be used to simultaneously measure two or more of distributed temperature, distributed strain, distributed vibration and distributed acoustic measurements.

It also should be understood that embodiments of the sensing systems described herein are not limited to sensing systems that include only one sensing fiber. Rather, the arrangements and techniques described herein also can be applied to sensing systems in which the adapter 122 enables two or more simultaneous distributed measurements from each of two or more sensing fibers. For example, the adapter 122 can be used to simultaneously measure temperature and vibration from a first fiber, and temperature and strain from a second fiber. In other words, embodiments of the present disclosure are directed to a device to enable simultaneous distributed measurements of two or more parameters from each of one or more fiber sensing fibers, where the number of sensing fibers in the system is less than the number of simultaneous measurements of different parameters of interest.

Turning now to FIG. 4, an embodiment of an adapter 122 is schematically illustrated. In this embodiment, the adapter 122 includes a wavelength division multiplexer (WDM) 130 to combine the different interrogation pulses launched into the sensing fiber 110 by multiple distributed measuring instruments, such as the instruments 117 and 119. The WDM 130 also splits the backscattered light generated by the fiber 110 in response to the combined interrogating pulses and directs the split backscatter to the appropriate measuring instrument 117 and 119. As an example, the WDM 130 can be configured to filter the received backscattered light so that the shorter wavelengths are passed to one of fiber sections 125, 127 and the longer wavelengths are passed to the other of fiber sections 125, 127 so the appropriate wavelengths are received by the appropriate measuring instrument 117, 119.

An example of an idealized filter response of the WDM 130 is illustrated in FIG. 5. As shown, the backscatter lighted input to WDM 130 from the sensing fiber 110 is split into two outputs, so that the high frequency wavelengths (represented by line 132) are provided to fiber section 125 and the low frequency wavelengths (represented by line 134) are provided to fiber section 127.

Returning to FIG. 4, the adapter 122 also includes elements 136 that are arranged to transform the interrogation pulses and backscatter so that they can be transmitted from one native fiber type to another. For example, in embodiments in which fiber sections 125 and 127 are a different native type than sensing fiber 110, elements 136 can transform the interrogation pulses transmitted on fiber section 124, for example, so that the pulses can be transmitted on sensing fiber 110. Likewise, the elements 136 can transform backscattered light received from sensing fiber 110 so that the backscatter can be transmitted on fiber section 125, as an example. By way of illustration, in an embodiment in which fiber section 125 is multimode fiber and section 127 is single mode fiber, elements 136 couple sections 125 and 127 to common single mode fiber to couple to the WDM 130.

In embodiments, use of the adapter 122 may introduce errors or otherwise affect the quality of the measurements obtained from the sensing fiber 110. For example, fiber couplings and the WDM 130 can add optical reflection and optical loss to the transmitted and received signals, thus reducing the backscatter signal and reducing the effective range of the instruments 117, 119. Consequently, the sensing system can also be configured to correct measurements obtained from the sensing fiber 110 to remove the effect of the adapter 122. As an example, a correction can be applied to the data acquired by instruments 117, 119 based on calibration information obtained from prior testing of the particular adapter 122 that is used to make the measurements. The instruments 117, 119 can be pre-configured with the appropriate correction information so that the correction is applied automatically as part of the acquisition of data from the backscattered light received by each of the instruments 117, 119.

In other embodiments, the correction can be implemented by using a double-ended measurement technique (as shown in FIG. 3) or by using multiple interrogation wavelengths. In such embodiments, both ends of the sensing fiber 110 are available to the surface instrument (e.g., instrument 117). Interrogation pulses are obtained from both ends of the fiber 110 and the fiber loss correction is derived from the double ended pulse configuration.

In embodiments, the adapter 122 itself can be configured to actively correct the measurements. For example, as shown in FIG. 4, the adapter 122 can include one or more reference coils 138 of optical fiber that are used to monitor reference signals amplitude and phase, under controlled conditions in reference coil(s) 138. Unwanted changes in the reference signal superimposed on the backscatter can then be removed from the backscatter signal.

In the embodiments described thus far, the measurements obtained from the sensing fiber 110 have been described as distributed measurements taken continuously along the length of the fiber 110. However, it should be understood that the present disclosure is not limited to such distributed measurements. For example, as shown in FIG. 7, the sensing system can be configured so that the instrument 117 acquires a distributed measurement while the instrument 119 acquires one or more point measurements obtained from discrete sensors 140 disposed along the length of the sensing fiber 110. The discrete sensors can be fiber Bragg gratings, as shown, or can be temperature or pressure gauges as further examples. Further, in some embodiments, one or more of the instruments 117 and 119 can be configured to obtain both distributed measurements and point measurements. For example, instruments 117, 119 can be configured to acquire backscatter generated by the natural imperfections in the glass of the sensing fiber 110, as well as backscatter generated by one or more fiber Bragg gratings formed in the fiber 110.

In addition to components to generate an interrogating pulse and detect the backscattered light generated by the fiber optic cable 110 in response, the measuring instruments 117, 119 can include a processing system 124 having one or more processing devices 126 and memory devices 128 to process the acquired data and to apply any correction to the acquired data to compensate for errors introduced by the adapter 122. In other embodiments, the data acquired by the instruments 117, 119 can be processed and corrected at a remote location.

Figure 6:
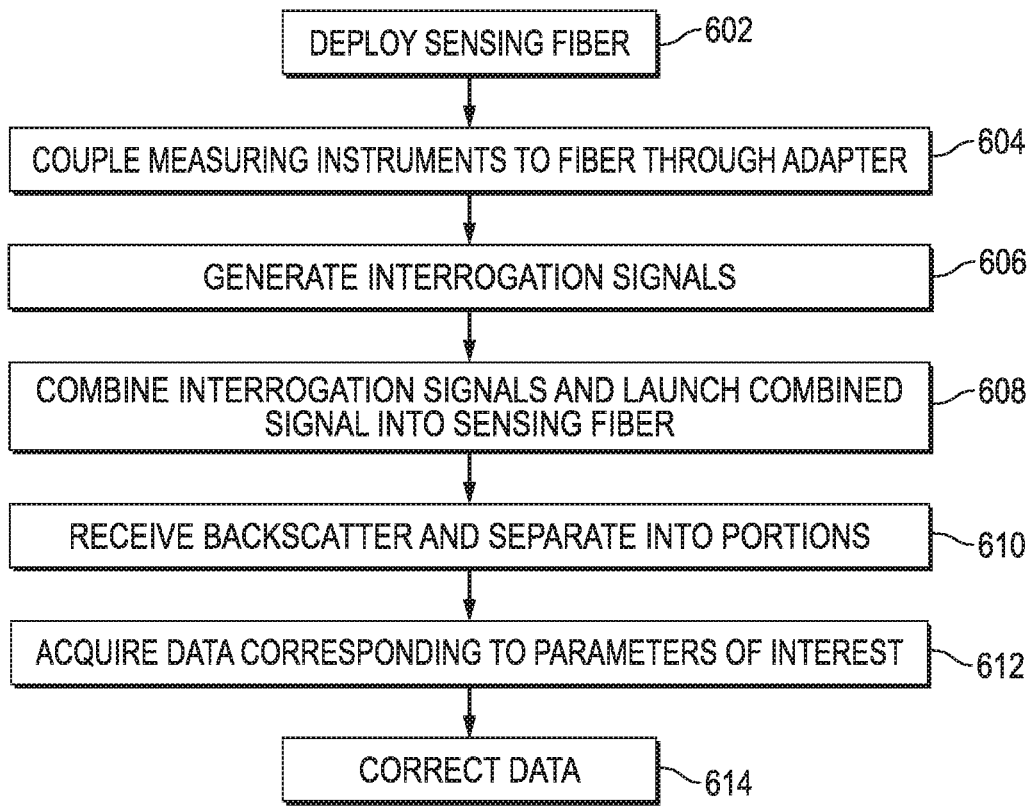
FIG. 6 is a flow diagram of an example technique for obtaining simultaneous distributed measurements of different parameters from an optical sensing fiber, according to an embodiment.

FIG. 6 is a flow diagram of a technique for obtaining two or more simultaneous distributed measurements from one or more sensing fibers. At block 602, a sensing fiber (e.g., fiber 110) is deployed along a desired measurement path (e.g., wellbore 104). At block 604, a first measuring instrument (e.g., instrument 117) and a second measuring instrument (e.g., instrument 119) are coupled to the sensing fiber through an adapter (e.g., adapter 122). At block 606, the instruments 117 and 119 are operated to generate interrogating probes to launch into the fiber 110. At block 608, the adapter 122 combines the interrogating probes and directs the combined signal into the fiber 110. At block 610, the adapter 122 receives backscattered light generated by the fiber 110 in response to the combined interrogating probes, separates the backscattered light into portions (e.g., based on wavelength filtering), and provides the separated backscatter portions to the appropriate instruments 117 and 119. At block 612, the instruments 117 and 119 acquire measurement data from their respective received backscatter portions, where the data acquired from one portion corresponds to a different parameter of interest than the data acquired from another portion. At block 614, a correction is applied to the measurement data to correct for effects of the adapter 122.

The flow and sequence of blocks shown in FIG. 6 is an example. It should be understood that various of the blocks may be performed in other sequences. For example, the correction shown in block 614 can be applied by the adapter 122 before the separated backscatter is provided to the instruments 117, 119.

In some embodiments, the systems and techniques described herein can be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system can comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well can communicate with systems or sub-systems that are located at the surface. The surface systems or subsystems in turn can communicate with other surface systems, such as systems that are at locations remote from the well.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A distributed measurement system, comprising:
a single distributed optical sensing fiber deployed along a desired measurement path;
a first measuring instrument to generate a first interrogating probe signal to launch into the optical sensing fiber and to acquire first measurement data from backscattered light generated by the distributed optical sensing fiber in response to the first interrogating probe signal;
a second measuring instrument to generate a second interrogating probe signal to launch into the optical sensing fiber and to acquire second measurement data from backscattered light generated by the distributed optical sensing fiber in response to the second interrogating probe signal; and
an adapter coupled to the first and second measuring instruments and to a first end of the single optical sensing fiber,
wherein the adapter is configured to combine the first and second interrogating probe signals for simultaneous launch into the first end of the single sensing fiber, separate the backscattered light generated in response to the combined interrogating probes, and provide a first separated portion of the backscattered light to the first measuring instrument and a second separate portion of the backscattered light to the second measuring instrument.

2. The distributed measurement system as recited in claim 1, wherein the first measuring instrument is a distributed temperature sensing instrument to measure temperature along the desired measurement path.

3. The distributed measurement system as recited in claim 2, wherein the second measuring instrument is a distributed vibration sensing instrument to measure vibration or strain along the desired measurement path.

4. The distributed measurement system as recited in claim 1, wherein the adapter includes a wavelength division multiplexer to separate the backscattered light into the first and second separated portions.

5. The distributed measurement system as recited in claim 1, wherein the adapter separates the backscattered light based on wavelength, and wherein the first separated portion includes wavelengths have frequencies higher than a threshold and the second separated portion includes wavelengths having frequencies lower than a threshold.

6. The distributed measurement system as recited in claim 1, wherein the distributed optical sensing fiber is a multimode fiber, and wherein one of the first and second measuring instruments is coupled to the adapter via a single-mode fiber.

7. The distributed measurement system as recited in claim 1, wherein a second end of the distributed optical sensing fiber is coupled to the first measuring instrument, and wherein the first measuring instrument obtains measurement data from backscattered light received from the second end of the distributed optical sensing fiber.

8. The distributed measurement system as recited in claim 7, wherein the first measuring instrument uses the measurement data obtained from the second end of the distributed optical sensing fiber to correct measurement data obtained from the first separated portion received from the adapter.

9. The distributed measurement system as recited in claim 1, wherein the distributed optical sensing fiber includes a plurality of discrete sensors disposed along its length, and wherein the first measuring instrument acquires measurement data from the discrete sensors and the second measuring instrument acquires measurement data continuously along the length of the distributed optical sensing fiber.

10. The distributed measurement system as recited in claim 9, wherein the discrete sensors are fiber Bragg gratings.

11. The distributed measurement system as recited in claim 1, wherein the desired measurement path is along a wellbore penetrating a hydrocarbon reservoir.

12. A method for making simultaneous distributed measurements along an optical sensing fiber deployed along a desired measurement path, comprising:
   deploying a distributed optical sensing fiber along a desired measurement path;
   combining, via an adapter, two or more interrogating probe signals, each of the two or more interrogating probe signals generated by a respective one of two or more distributed measuring instruments;
   simultaneously launching the two or more interrogating probe signals into the optical sensing fiber; and
   acquiring a distributed measurement of a first parameter of interest from the distributed optical sensing fiber simultaneously with acquiring a distributed measurement of a second parameter of interest from the distributed optical sensing fiber, wherein the first parameter of interest is different than the second parameter of interest.

13. The method as recited in claim 12, wherein the first parameter of interest is temperature and the second parameter of interest is vibration or strain.

14. The method as recited in claim 12, further comprising:
   generating a first interrogating probe signal for launching into the optical sensing fiber;
   generating a second interrogating probe signal for launching into the optical sensing fiber;
   combining the first and second interrogating probe signals; and
   launching the combined first and second interrogating probe signals into the optical sensing fiber.

15. The method as recited in claim 14, further comprising:
   separating backscattered light generated in response to the combined first and second interrogating probe signals into a first separated portion and a second separated portion;
   acquiring first distributed measurement data corresponding to the first parameter of interest from the first separated portion; and
   acquiring second distributed measurement data corresponding to the second parameter of interest from the second separated portion.

16. The method as recited in claim 15, wherein separating the backscattered light comprises wavelength filtering the backscattered light.

17. The method as recited in claim 15, further comprising correcting the first and second distributed measurement data for errors arising from at least one of combining the first and second interrogating probe signals and separating the backscattered light into the first and second separated portions.

18. A distributed measurement system for use in a wellbore penetrating a hydrocarbon reservoir, comprising:
   a distributed optical sensing fiber deployed in the wellbore;
   an adapter to combine two or more interrogating probe signals to launch simultaneously into the optical sensing fiber and to separate backscattered light generated by the distributed optical sensing fiber in response to the combined two or more interrogating probe signals into a first backscatter portion and a second backscatter portion; and
   a data acquisition system to acquire first measurement data from the first backscatter portion and second measurement data from the second backscatter portion, wherein the first measurement data corresponds to a first parameter of interest incident along the length of the distributed optical sensing fiber in the wellbore and the second measurement data corresponds to a second parameter of interest incident along the length of the distributed optical sensing fiber in the wellbore that is different from the first parameter of interest.

19. The system as recited in claim 18, wherein the first parameter of interest is temperature, and the data acquisition system includes a distributed temperature measuring instrument.

20. The system as recited in claim 19, wherein the second parameter of interest is vibration or strain, and the data acquisition system includes a distributed vibration measuring instrument.

* * * * *